US008572239B2

(12) United States Patent
Cao et al.

(10) Patent No.: US 8,572,239 B2
(45) Date of Patent: Oct. 29, 2013

(54) NODE CLUSTERING

(75) Inventors: Fei Cao, Issaquah, WA (US); Shaoyu Zhou, Issaquah, WA (US); Zhuoqing Wu, Jr., Bellevue, WA (US); Sijian Zhang, Bellevue, WA (US); Siddhartha Roy, Bellevue, WA (US); Michael A. Elizarov, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 339 days.

(21) Appl. No.: 12/885,897

(22) Filed: Sep. 20, 2010

(65) Prior Publication Data

US 2012/0072554 A1 Mar. 22, 2012

(51) Int. Cl.
*G06F 15/177* (2006.01)
*G06F 15/16* (2006.01)

(52) U.S. Cl.
USPC .......................................................... 709/224

(58) Field of Classification Search
None
See application file for complete search history.

(56) References Cited

U.S. PATENT DOCUMENTS

| | | | |
|---|---|---|---|
| 5,497,486 A | 3/1996 | Stolfo et al. | |
| 5,832,182 A | 11/1998 | Zhang et al. | |
| 5,983,224 A | 11/1999 | Singh et al. | |
| 6,421,668 B1 | 7/2002 | Yakhini et al. | |
| 7,020,701 B1* | 3/2006 | Gelvin et al. | 709/224 |
| 7,496,051 B2* | 2/2009 | Wan et al. | 370/254 |
| 2006/0047655 A1 | 3/2006 | Peter | |
| 2009/0172139 A1* | 7/2009 | Wong et al. | 709/223 |

OTHER PUBLICATIONS

Prasad; et al., "A Survey on Clustering"—Published Date: Jul. 2010, International Journal of Engineering Science and Technology vol. 2 (7), 2010, pp. 2707-2714, http://www.ijest.info/docs/IJEST10-02-07-46.pdf.
Wei; et al., "Empirical Comparison of Fast Clustering Algorithms for Large Data Sets"—Published Date: 2000, Proceedings of the 33rd Hawaii International Conference on System Sciences, pp. 1-10, http://www.computer.org/comp/proceedings/hicss/2000/0493/02/04932013.pdf.
Huang, Zhexue "A Fast Clustering Algorithm to Cluster Very Large Categorical Data Sets in Data Mining"—Published Date: Apr. 2005, http://citeseerx.ist.psu.edu/viewdoc/download?doi=10.1.1.134.83&rep=rep1&type=pdf.

* cited by examiner

*Primary Examiner* — Hassan Phillips
*Assistant Examiner* — Omeed D Rahgozar
(74) *Attorney, Agent, or Firm* — Microsoft Corporation (57) ABSTRACT

Large sets of unorganized data may provide little value in identifying useful observations from such data. For example, an online merchant may maintain a database of millions of user IDs (e.g., a cookie ID, a login ID, a device ID, a network ID, etc.) along with content viewed and/or actions taken with the user IDs, where minimal associations are known between user IDs. It may be advantageous to link together user IDs of respective users to capture a comprehensive view of respective users' activities. Accordingly, one or more systems and/or techniques for identifying a cluster of nodes based upon transforming a set of node pairings (e.g., pairings of related nodes) one or more times are disclosed herein. Iterative transformations may be performed until respective nodes are paired with merely their smallest neighboring node and are paired with no other node. In this way, node clusters may be identifiable.

20 Claims, 9 Drawing Sheets

NODE CLUSTERING

BACKGROUND

In today's computing environment, large amounts of data are generated, stored, and consumed. For example, users may access a social network to share photos, thoughts, and other information with friends. A company may store user login IDs and user resource access information within large data logs. Search websites may generate cookie IDs and search query information of users. It may be advantageous to organize and analyze such data based upon relationships between objects within the data. In one example, a corpus of data may represent millions of users and actions taken by the users. Associations between users and user actions may be used to determine a comprehensive understanding of the user (e.g., interests of the user, other users sharing the same interests, information relevant to the user, how the user may be affected by an epidemic, and/or millions of other observations about the user). In one example, a user may have browsed a car website using a cookie ID. Additionally, the user may have browsed a high-end expensive handbag website using a second cookie ID. The cookie IDs and user browsing actions may be correlated together to determine that the user may be interested in luxury cars. In this way, relevant information, such as targeted advertisements and luxury car reviews, may be provided to the user. In another example, public health information may be correlated together to identify target groups that may be affected by epidemic outbreaks. It may be appreciated that a variety of associations and inferences may be determined based upon processing large amounts of data, for example.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for identifying one or more node clusters are disclosed herein. That is, one or more node clusters (e.g., a million node clusters) may be identified from within a large set of data based upon processing node pairings (e.g., a billion pairings of (two) nodes), where respective nodes within a cluster generally have something in common. A node may represent an object, such as an individual, a user ID and a user action taken using the user ID, behavior data of a user, and/or a wide variety of other objects. Connections between nodes within a node pairing may represent a relationship between the objects represented by the paired nodes. The nodes pairings may have been independently derived from the large set of data based upon relationships between nodes. For example, a node pairing may comprise a first node relating to a cookie ID where a user visited a car website and a second node relating to a mobile phone ID where the user visited a high-end expensive handbag website. The first node and the second node may be paired within the node pairing based upon the nodes sharing an association (e.g., a temporal association, a similar user association, a similar device association, and/or other associations).

One or more node clusters may be identified based upon transforming a set of node pairings one or more times (e.g., the set of node pairings may be transformed one or more times until respective nodes are paired with merely a single neighboring node having a desirable value (e.g., smallest, largest, etc.) and are connected to no other nodes). A node cluster may comprise nodes that bear a transitive symmetric relationship, where nodes in different clusters do not bear a transitive symmetric relationship to nodes within the node cluster. A symmetric relationship indicates that if node A is connected to node B, then node B is connected to node A (e.g., if A works for the same company as B, then B works for the same company as A). A transitive relationship indicates that if node A is connected to node B, and node B is connected to node C, then node A is connected to node C (e.g., if A works for the same company as B, and B works with the same company as C, then A and C work for the same company). It may be appreciated that quantifiable/comparable values, such as hash values, may be assigned to respective nodes within the plurality of nodes (e.g., to provide a mechanism for comparing the nodes).

A set of node pairings corresponding to a plurality of nodes may be received. A node pairing may comprise a first node connected to a second node based upon an association/relationship between the nodes (e.g., a first node and a second node may represent two login IDs that were generated from the same computing device). The set of node pairings may be transformed one or more times until one or more node clusters are identified from the plurality of nodes. In one example, iterative transformations may be performed until respective nodes within the plurality of nodes are paired with merely their smallest neighboring node (e.g., a base node) and are paired with no other node, otherwise additional transformations may be performed. It will be appreciated that different clusters may be identified by their respective base nodes. That is, where different nodes are connected to or paired with the same single node (e.g., the base node) and no other nodes, then these nodes comprise a cluster, and the cluster may thus be identified by the base node. Accordingly, where there are multiple base nodes, then there are multiple clusters (e.g., where respective clusters comprise nodes that are paired with a base node of the cluster but no other nodes). Respective clusters can thus be identified by their corresponding base nodes.

Figure 4:
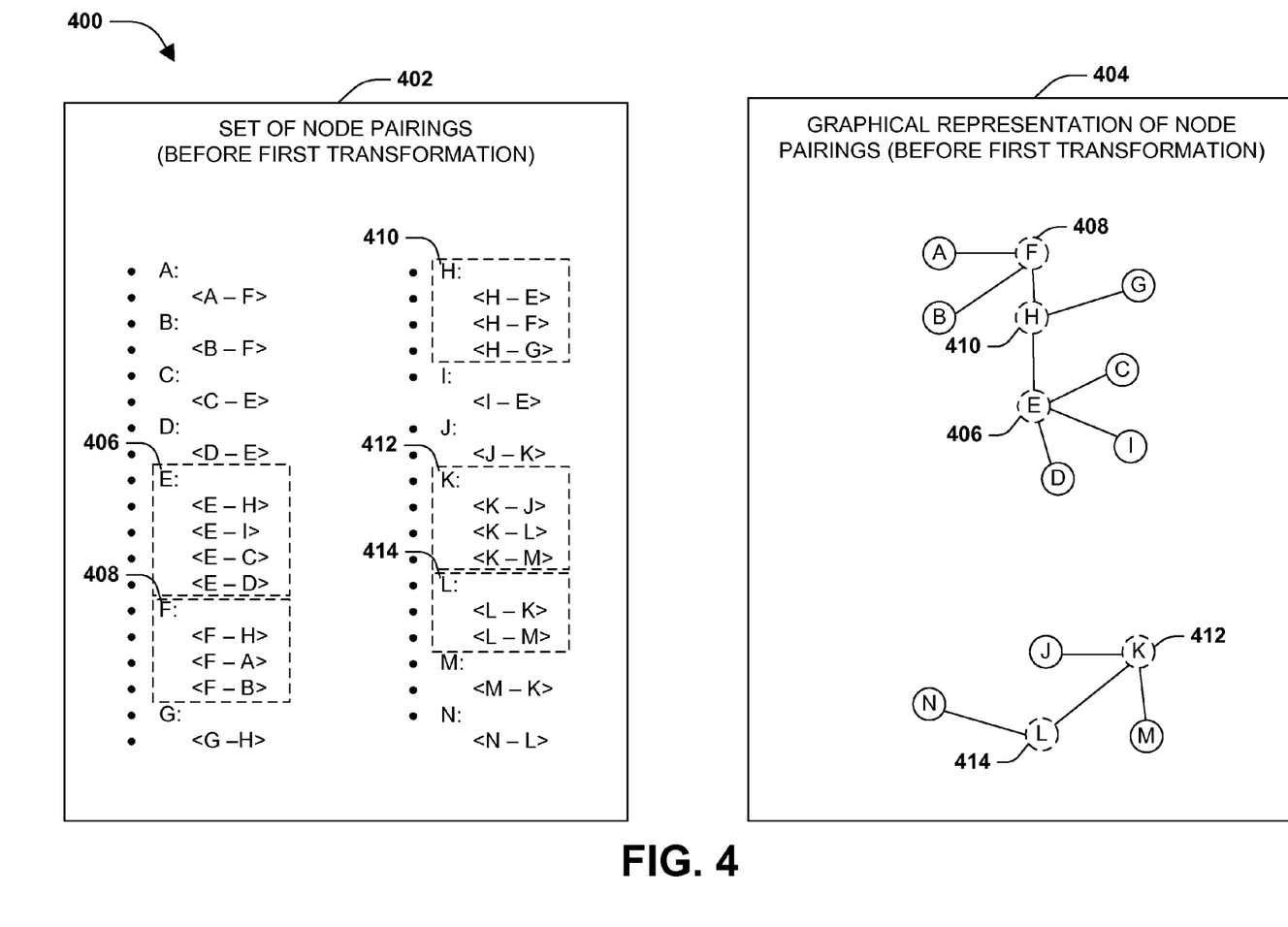
FIG. 4 is an illustration of an example of a set of node pairings and a graphical representation of the node pairings before a first transformation is performed.

It may be appreciated that in the course of performing iterative transformations, a node regarded as a current node may correspond to a node paired with more than one neighboring node (e.g., current node E is paired with neighboring nodes H, I, C, and D within FIG. 4). A neighboring node may correspond to a node paired with a current node. A reference node may be a particular neighboring node of a current node, where the reference node has a desirable value in comparison with other neighboring nodes of the current node (e.g., the reference node may be a neighboring node comprising a smaller hash value than hash values of neighboring nodes). For example, a current node E may be paired with neighboring nodes H, I, C, and D, where node C is the reference node because the alphabetical designation C is smaller than the alphabetical designations of the neighboring nodes H, I and D (e.g., current node E 406 of FIG. 4). A base node may be a node within a node cluster, where respective nodes within the node cluster are connected merely with the base node and are connected to no other nodes (e.g., a base node may have a smaller hash value than respective nodes within the node cluster). The base node may be used to reference nodes within the node cluster because the base node is connected to respective nodes within the cluster. It may be appreciated that a base node may be unidentifiable until a node cluster is identified (e.g., all transformations are complete).

In one example of transforming, for respective current nodes paired with more than one neighboring nodes: a reference node with which a current node is paired may be determined. The reference node may be determined based upon comparing neighboring nodes of the current node. For example, the reference node may be a neighboring node comprising a hash value smaller than hash values of respective other neighboring nodes of the current node (e.g., a current node 8 may be connected to neighboring nodes 2, 3, and 6, where node 2 may be determined as the reference node because the numerical designation of 2 is smaller than the numerical designations of nodes 3 and 6). Neighboring nodes, other than the reference node, may be disconnected from the current node, and may be connected to the reference node (e.g., neighboring nodes 3 and 6 may be disconnected from current node 8, and connected to reference node 2). In one example, the set of node pairings may be updated based upon the disconnecting/reconnecting that may alter node pairings (e.g., nodes 3 and 6 are paired with node 2, instead of node 8). It may be appreciated that such connecting/disconnecting may generate similar or different node pairings within the set of node pairings, thus transforming the set of node pairings.

In one example of performing one or more transformations, the set of node pairings may be iteratively transformed until respective nodes are connected merely with their smallest neighboring node (e.g., the smallest node within a cluster) and are connect to no other node.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Many companies and other entities are attempting to aggregate data in an organized and useful manner. For example, an online merchant may generate a large amount of stored data (e.g., a table with billions of records of data) based upon users accessing the online merchant's website. Unfortunately, associations between records may be unknown, or at best, associations may be known for merely pairings of records. For example, a user may login with a cookie ID to the online merchant's website to view cars. At another point in time, the user may login using a login ID to the online merchant's website to view expensive watches. The cookie ID and the login ID may be correlated together as a node pairing, which may be used to determine that the user may have an interest in luxury cars. In this way, the online merchant may provide the user with relevant information relating to luxury cars. To provide a comprehensive understanding of the user (e.g., interests of the user, friends of the user, and/or other characteristics of the user), it may be advantageous to determine other identifying data relating to the user (e.g., multiple instances of a cookie ID; one or more login IDs of a user, other description or behavioral data of the user, etc.). In this way, a comprehensive understanding of users may be determined based upon transforming the online merchant's stored data (e.g., transforming node pairings, where a first node may represent a user ID and a second node may represent an IP address, for example, <userID, IPAddress>) such that node clusters corresponding to users may be determined, for example.

Accordingly, one or more node clusters may be identified from a plurality of nodes based upon transforming a set of node pairings one or more times. Nodes within the plurality of nodes may representing a variety of things, such as individuals within a social network, employees of one or more companies, individuals within a public health record database, user login IDs along with content viewed and/or actions taken with the user login IDs, cookie IDs along with content viewed and/or actions taken with the cookie IDs, and/or other entities or ideas. Nodes within the plurality of nodes may be assigned quantifiable/comparable values, such as hash values. For example, hash values may be assigned to nodes representing user login IDs based upon timestamps of when respective user login IDs were used. It may be appreciated that any quantifiable and/or comparable values may be assigned to nodes.

Nodes within the plurality of nodes may be paired into node pairings. A node pairing may comprise a first node, a second node, and a connection representing a relationship/association between the first and second node (e.g., employee A and employee B that both work for the same company). The set of node pairings may be transformed one or more times until one or more node clusters are identified from the plurality of nodes. In one example, iterative transformations may be performed until respective nodes within the plurality of nodes are paired with merely their smallest neighboring node (e.g., the smallest node within a cluster) and are paired with no other node, otherwise additional transformations may be performed.

Once identifiable, a node cluster may comprise nodes that are paired with a base node (e.g., a node having a smaller hash value than respective hash values of nodes connected to the base node) by a single connection and are connected to no other nodes. The nodes within the cluster may bear a symmetric (e.g., if node A is paired with node B, then node B is paired with node A) and transitive (e.g., if node A is paired with node B, and node B is paired with node C, then node A is paired with node C) relationship, where nodes in different clusters do not bear a symmetric or transitive relationship to these nodes.

In one example, a plurality of nodes may comprise billions of nodes representing user IDs relating to interactions of users while using respective user IDs. For example, a first node may represent a first cookie ID used when visiting a commerce website, a second node may represent a mobile phone ID used when uploading an image to a photo sharing website, a third node may represent a second cookie ID used to visit the commerce website, a fourth node may represent a user login for a banking website, etc. It may be appreciated that the plurality of nodes may correspond to millions of users accessing different internet resources through a variety of user IDs. Node pairings may have been derived from the plurality of nodes. In one example, a user may have visited a website using a cookie ID through a mobile phone having a mobile phone ID. In another example, a user may have visited a website using a first cookie ID, and then the same user may have visited a second website using a second cookie ID. In this way, node pairings may be independently derived from the plurality of nodes.

A set of node pairings may be received. The set of node pairings may be iteratively transformed until respective nodes are paired with merely a single neighboring node having a desirable value (e.g., a smallest, largest, etc.) and are connected to no other nodes. In this way, one or more node clusters may be identified. In one example, a node cluster may comprise nodes representing user IDs (e.g., a login ID along with content viewed and/or actions taken by the user while using the ID, such as viewing item for sale at a merchant website) of a single user that may provide insight into behaviors and/or interests of the user. For example, node cluster of a user may comprise a first node of a user ID used to visit a travel website, a second node of a user ID used to view images of the soccer, a third node of a user ID used to visit a leisure activities website, etc. One or more inferences may be drawn from the node cluster of the user. For example, the user may be interested in a vacation to a location hosting a large soccer tournament. In this way, pairings of user IDs independently generated from a plurality of user IDs of users may be grouped into node clusters comprising related user behavior data that may be analyzed to learn more about the users.

Figure 1:
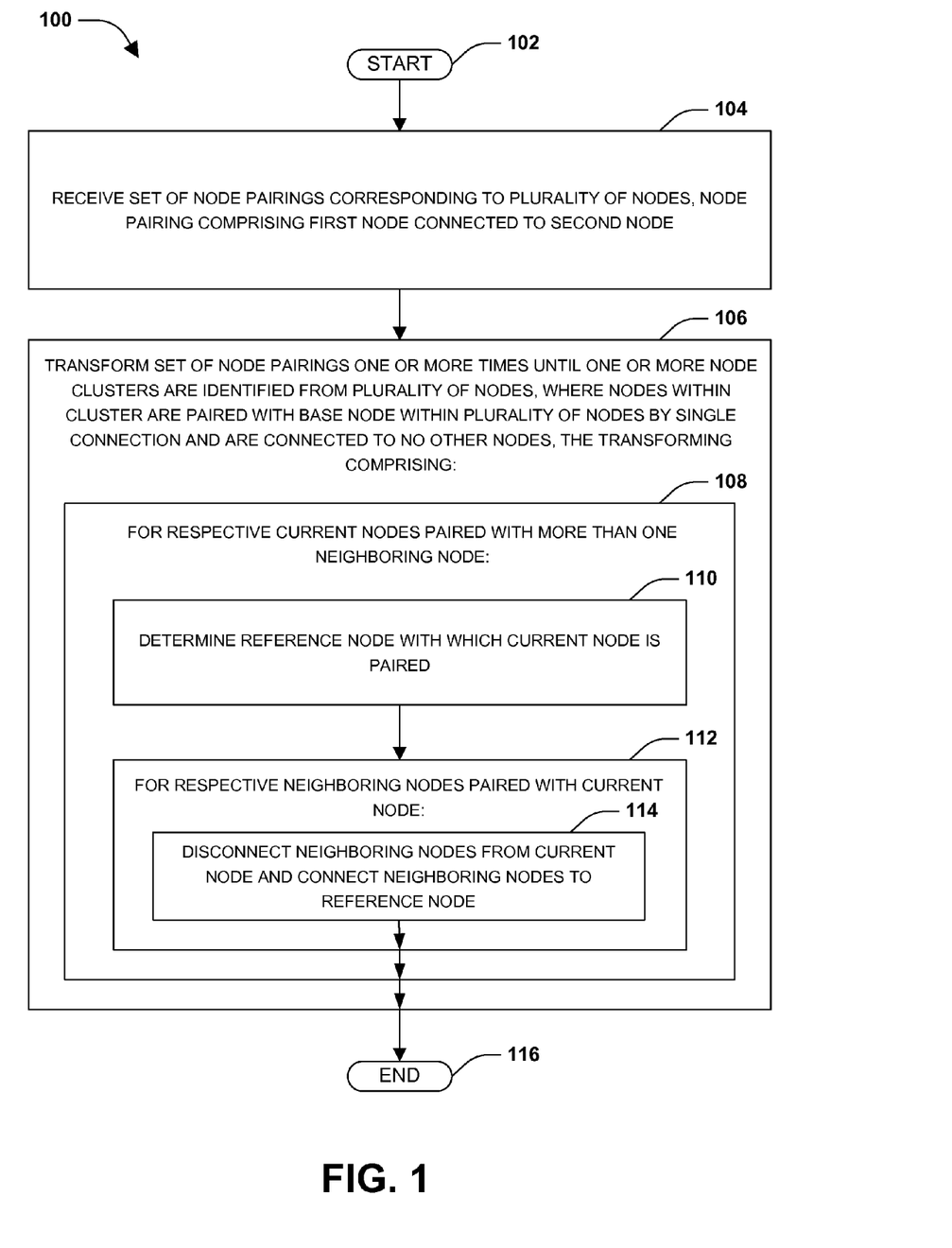
FIG. 1 is a flow chart illustrating an exemplary method of identifying one or more node clusters.

One embodiment of identifying one or more node clusters is illustrated by an exemplary method 100 in FIG. 1. At 102, the method starts. At 104, a set of node pairings corresponding to a plurality of nodes may be received. A node pairing may comprise a first node connected to a second node. In one example, nodes within the plurality of nodes may represent descriptive data of an individual (e.g., a node may represent a user ID used to visit an expensive handbag website). Connections between nodes within a node pairing may represent relationships between paired nodes (e.g., a first node representing a first user ID may have been used by a user to visit an expensive handbag website and a second node representing a second user ID may have been used by the same user to visit a car website, where the connection may represent a relationship between the first and second user ID, such as the first and second user ID sharing the same IP address (or the same browser session), which may indicate the first and second user IDs belong to the same user). In such an example, an identified node cluster may comprise nodes associated with an individual, where the nodes may provide user behavior data associated with user IDs of nodes within the node cluster (e.g., the user is interest in handbags, cars, vacations, pizza, etc. based upon information browsed while using the user IDs within the node cluster). In another example, nodes within the plurality of nodes may represent individuals, where connections between nodes may represent relationships between individuals.

Quantifiable/comparable values may be assigned to nodes within the plurality of nodes (e.g., hash values based upon ordered timestamp data may be assigned to nodes).

At 106, the set of node pairings may be transformed one or more times until one or more node clusters are identified from the plurality of nodes. In one example, the set of node pairings may be transformed one or more times until respective nodes are paired with merely a single neighboring node having a desirable value (e.g., smallest, largest, etc.) and are connected to no other nodes. For example, iterative transformations may be performed until respective nodes within the plurality of nodes are paired with merely their smallest neighboring node (e.g., a base node) and are paired with no other node, otherwise additional transformations may be performed where one or more nodes may still be connecting to neighboring nodes having smaller values (e.g., else additional nodes may exist that have yet to be included within a node cluster). A node cluster may comprise nodes paired with a base node within the plurality of nodes by a single connection and are connected to no other nodes (e.g., node 3, node 5, node 7, node 9 are connected merely to node 1 and are connected to no other nodes). Thus, respective nodes, other than the base node, are paired merely with the base node and no other node.

It may be appreciated that a current node may be a node connected to more than one neighboring node. A neighboring node may be a node paired with a current node. A reference node may be a neighboring node comprising desirable value, such as a smaller hash value than respective hash values of other neighboring nodes of the current node. Additionally, a reference node may comprise a hash value smaller than a hash value of the current node. A base node of a node cluster may comprise a smaller hash value than respective hash values of nodes within the node cluster. It may be appreciated that in one example, a base node of a node cluster may be unknown until the node cluster is identifiable (e.g., all transformations are complete), otherwise additional nodes having smaller hash values may exist that have yet to be included within the node cluster.

A transformation may comprise evaluating current nodes paired with more than one neighboring node, at 108. That is, for respective current nodes, a reference node paired with the current node may be determined, at 110. For example, a current node 5 may be paired with node 2, node 3, node 6, and node 9, where the node number corresponds to a value of the node. Node 2 may be determined as the reference node because node 2 may have a smaller value than respective values of nodes 3, 6, and 9. Additionally, node 2 may have a smaller value than the value of the current node 5.

At 112, for respective neighboring nodes paired with the current node, neighboring nodes may be disconnected from the current node and connected to the reference node, at 114. For example, nodes 3, 6, and 9 may be disconnected from current node 5, and may be connected to reference node 2. In one example, if the value of the reference node is larger than or equal to the value of the current node, then the disconnecting and reconnecting of neighboring nodes may be refrained from being performed because the neighboring nodes are already connected to the current node, which has a smaller value than the reference node (e.g., the current node already serves as the reference node). It may be appreciated that a transformation of the set of node pairings may comprising reassigning node pairings within the set of node pairings to reflect disconnected node pairings and/or newly connected node pairings generated during a transformation. That is, the connecting/disconnecting may generate similar or different node pairings within the set of node pairings, thus transforming the set of node pairings.

It may be appreciated that current nodes may be processed in parallel (e.g., multiple processors and/or computing devices may process current nodes during a transformation). Parallel processing allows the transformation to be scaled to a large amount of nodes (e.g., billions of nodes).

When one or more transformations have been performed, one or more node clusters may be identifiable. A node cluster may comprise nodes that are connected merely to a base node (e.g., a node having a smaller hash value than respective hash values of nodes within the node cluster) and are connect to no other nodes (e.g., a node cluster may comprise nodes 2, 5, 7, 8, and 10, where nodes 5, 7, 8, and 10 are merely connected to base node 2 and no other nodes). A node cluster may comprise nodes that bear a symmetric and transitive relationship, where nodes in different clusters do not bear a symmetric or transitive relationship to nodes within the node cluster.

In one example, a node cluster may comprise nodes representing user IDs of a single user (e.g., a cookie used to visit an expensive handbag website, a login ID used to purchase an expensive ring, etc.). The node cluster may be analyzed to determine behaviors, interests, and/or other information about the user (e.g., the user may have an interest in luxury shopping items). In order to retrieve the node cluster from the plurality of nodes, the base node of the node cluster may be queried to retrieve the node cluster. At 116, the method ends.

Figure 2:
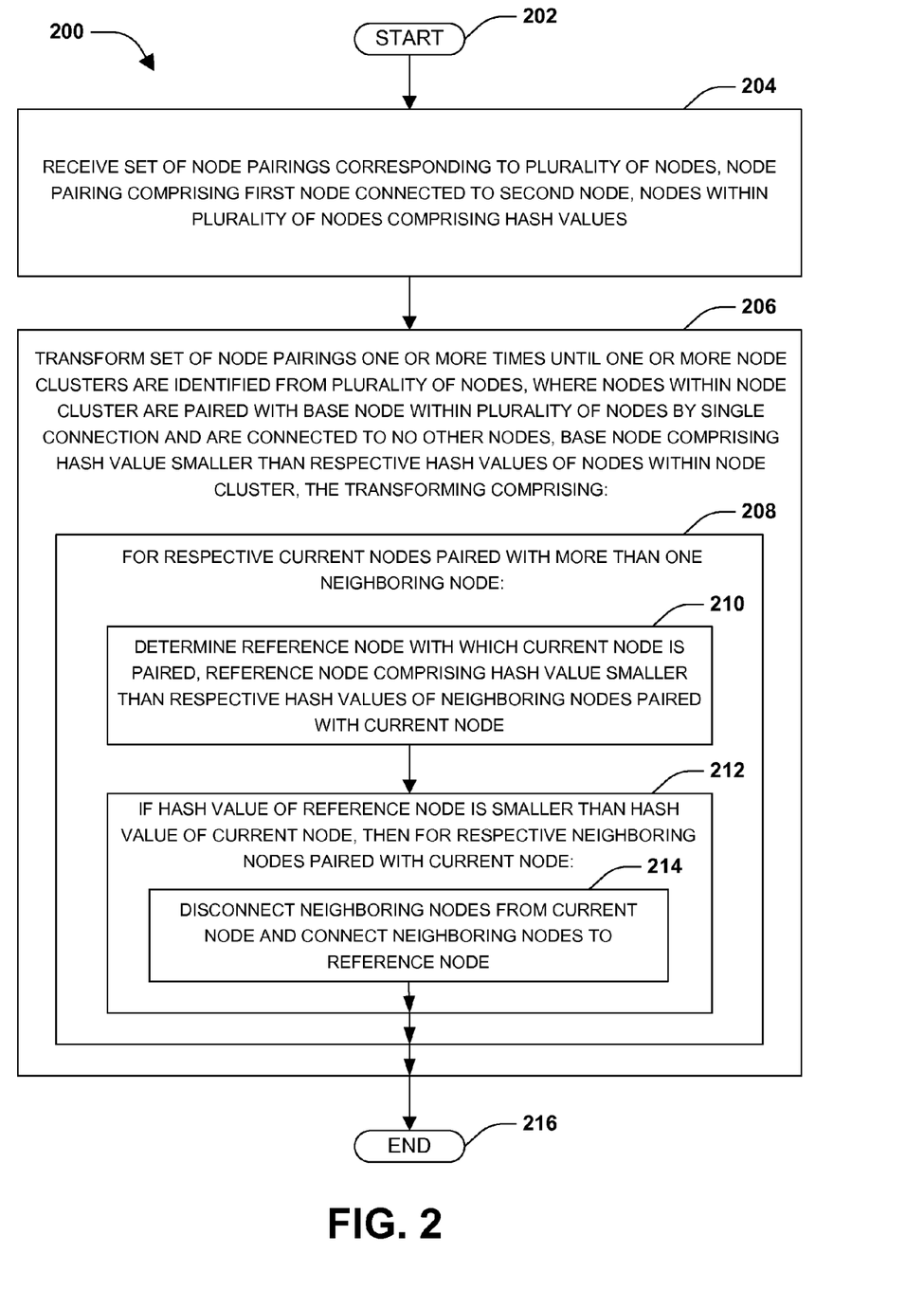
FIG. 2 is a flow chart illustrating an exemplary method of identifying one or more node clusters.

One embodiment of identifying one or more node clusters is illustrated by an exemplary method 200 in FIG. 2. At 202, the method starts. At 204, a set of node pairings corresponding to a plurality of nodes may be received. A node pairing may comprise a first node connected to a second node. Nodes within the plurality of nodes may comprise hash values.

At 206, the set of node pairings may be transformed one or more times until one or more node clusters are identified from the plurality of nodes. Nodes within a node cluster may be paired with a base node within the plurality of nodes by a single connection and may be connected to no other nodes. It may be appreciated that a base node of a node cluster may be unknown until the node cluster is identifiable (e.g., all possible transformations are performed). The base node may comprise a hash value smaller than respective hash values of nodes within the node cluster.

A transformation may comprise evaluating current nodes paired with more than one neighboring node, at 208. That is, for respective current nodes, a reference node with which a current node is paired may be determined, at 210. The reference node may comprise a hash value smaller than respective hash values of neighboring nodes parried with the current node. At 212, if the hash value of the reference node is smaller than a hash value of the current node, then for respective neighboring nodes paired with the current node, disconnect neighboring nodes from the current node and connecting the neighboring nodes to the reference node, at 214. It may be appreciated that a transformation of the set of node pairings may comprising reassigning node pairings within the set of node pairings to reflect the disconnection and/or reconnection of nodes during a transformation. Once one or more transformations are performed (e.g., respective nodes are paired with merely the smallest neighboring node (base node) and no other node), then the one or more node clusters may be identifiable. In this way, pairings of nodes independently generated may be transformed into node clusters of related nodes (e.g., nodes comprising a symmetric and transitive relationship).

Figure 3:
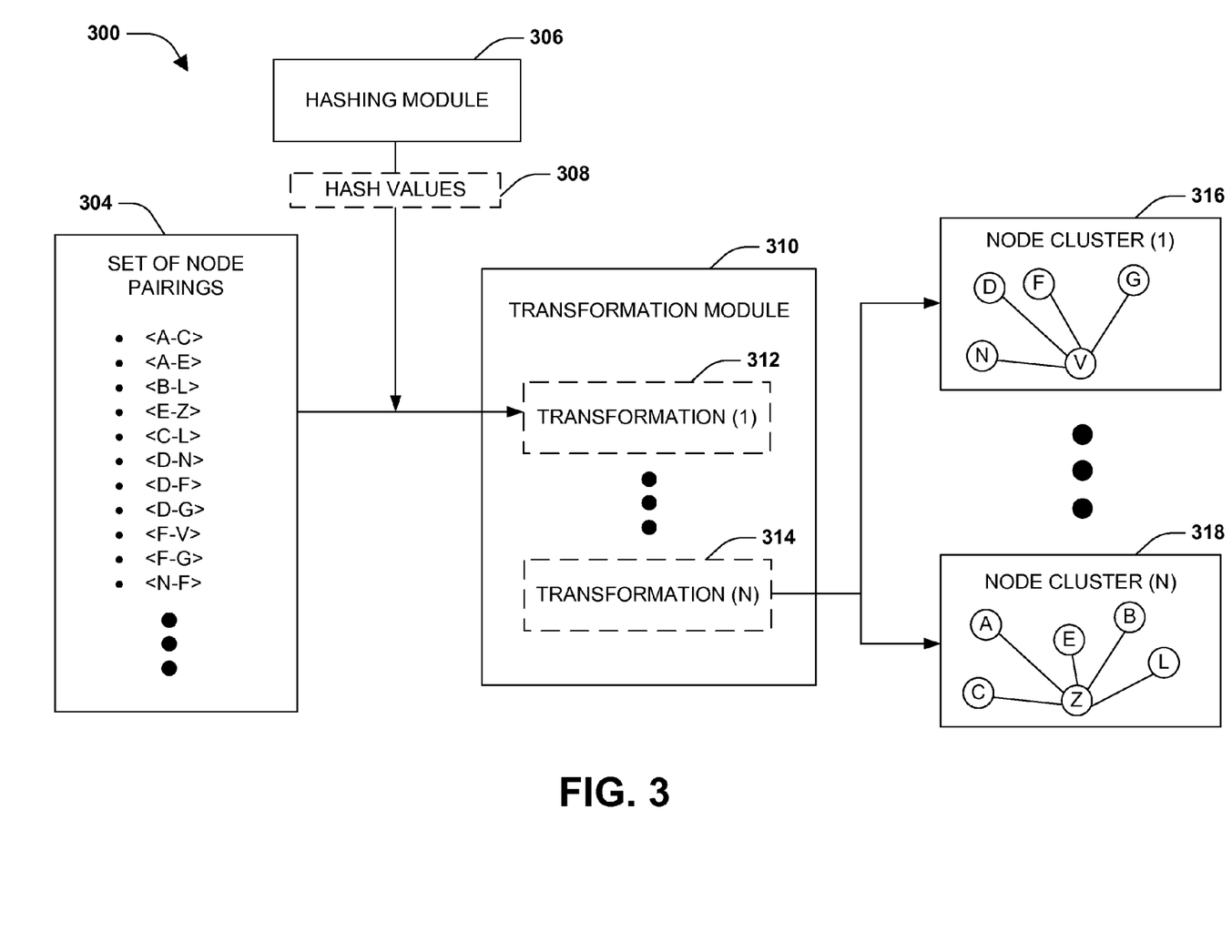
FIG. 3 is a component block diagram illustrating an exemplary system for identifying one or more node clusters.

FIG. 3 illustrates an example of a system 300 configured for identifying one or more node clusters. The system 300 may comprise a transformation module 310 and/or a hashing module 306. The transformation module 310 may be configured to receive a set of nodes pairings 304 corresponding to a plurality of nodes, where a node paring comprises a first node connected to a second node. For example, the set of node pairings 304 may comprise node pairings: <A-C>, <A-E>, <B-L>, <E-Z>, etc. A node pairing may comprise two related nodes (e.g., node A may represent a first employee that works for the same company as a second employee represented by node C). It may be appreciated that node pairings may comprise a symmetric relationship. For example, if a first employee (node A) works for the same company as a second employee (node C), then the second employee (node C) works for the same company as the first employee (node A), thus employees that are known to work with the first employee may work with the second employee, and employees that are known to work with the second employee may work with the first employee.

The hashing module 306 may be configured to assigned hash values 308 to respective nodes within the plurality of nodes (e.g., assign values before or after nodes within the plurality of nodes are paired into node pairings). It may be appreciated that the hash values 308 may be based upon a variety of factors relating to the nodes.

The transformation module 310 may be configured to transform the set of node pairings 304 one or more times (e.g., transformation (1) 312 through transformation (N) 314). In one example, iterative transformations may be performed until respective nodes within the plurality of nodes are paired with merely their smallest neighboring node (e.g., a base node having a smaller hash value than respective hash values of nodes within a node cluster) and are paired with no other nodes, otherwise additional transformations may be performed where one or more nodes may still be connecting to neighboring nodes having smaller values (e.g., else additional nodes may exist that have yet to be included within a node cluster).

The transformation module 310 may transformation the set of node pairings (e.g., update node pairings within the set of node parings 304) by evaluating current nodes (e.g., a node paired with more than one neighboring node). That is, for respective current nodes, a reference node paired with a current node may be determined. In one example, the reference node may be a neighboring node of the current node that has a smaller hash value than respective hash values of neighboring nodes of the current node. Additionally, the reference node may comprise a hash value smaller than the hash value of the current node, otherwise the transformation module 310 may refrain from disconnecting/connecting neighboring nodes to the reference node because the neighboring nodes may already be connected to their smallest neighboring node, the current node.

Once a reference node is determined, the transformation module 310 may disconnect neighboring nodes, other than the reference node, from the current node, and connect such neighboring nodes to the reference node. In this way, one or more node clusters may be identified (e.g., node cluster (1) 316 through node cluster (N) 318).

In one example, the plurality of nodes may comprise node A (hash value of 18), node B (hash value of 20), node C (hash value of 6), node D (hash value of 3), node E (hash value of 35), node F (hash value of 17), node G (hash value of 89), node L (hash value of 62), node N (hash value of 91), node V (hash value of 2), node Z (hash value of 1), and/or other nodes not illustrated. Based upon one or more transformations, node cluster (1) 316, node cluster (N) 318, and/or other node clusters not illustrated may be identified. Node cluster (1) 316 may comprise nodes D, F, G, and N connected to base node V because base node V has a smaller hash value than hash values of nodes D, F, G, and N. Node cluster (N) 318 may comprise nodes A, B, C, E, and L connected to base node Z because base node Z has a smaller hash value than hash values of nodes A, B, C, E, and L. In one example, Node cluster (1) 316 may represent company A, where nodes D, F, G, N, and V may represent employees that work for company A. Node cluster (N) 318 may represent company B, where nodes A, B, C, E, L, and Z represent employees that work from company B.

FIG. 4 illustrates an example 400 of a set of node pairings 402 and a graphical representation of the node pairings 404 before a first transformation is performed. It may be appreciated that the set of node pairings 402 may be an input to a first transformation, while the graphical representation of node pairings 404 is merely provided for illustrative purposes.

In one example, the set of node pairings 402 may comprise node pairings representing employees of various companies. Initially, pairings of two employees that work for the same company may be known (e.g., node A representing employee A may work at the same company as employee F represented by node F; node B representing employee B may work at the same company as employee F represented by node F; node C representing employee C may work at the same company as employee E represented by node E; etc.), but little to no other information may be known about groupings of employees that work for the same company. Thus, it may be advantageous to transform the set of node pairings 402 one or more times to identify node clusters of employees that work for similar companies (e.g., employees A, B, C, D, E, F, G, H, and I may work for company A, while employees J, K, L, M, and N may work for company B, etc.).

In one example of a first transformation, current node E 406, current node F 408, current node H 410, current node K 412, and/or current node L 414 may be processed (e.g., the current nodes may be processed in parallel). In this example, nodes may have been assigned comparable hash values based upon alphabetical designations of the nodes (e.g., node A may be treated as "smaller" than node B; node B may be treated as "smaller" than node C; etc.).

Current node E 406 is paired with neighboring node H, neighboring node I, neighboring node C, and neighboring node D (e.g., current node E 406 is list within the set of node pairings 402 as being paired with nodes H, I, C, and D; similarly current node E 406 is illustrated within the graphical representation of node pairings 404 as having direct connections to nodes H, I, C, and D). Node C may be determined as a reference node because C is a "smaller" alphabetical designation than alphabetical designations D, I, and H of the other neighboring nodes (e.g., C is "smaller" than D, I, and H) and because alphabetical designation C is "smaller" than the alphabetical designation for the current node E 406 (e.g., C is "smaller" than E). The neighboring nodes D, I, and H may be disconnected from current node E 406, and may be connected to reference node C.

Current node F is paired with neighboring node H, neighboring node A, and neighboring node B (e.g., current node F 408 is list within the set of node pairings 402 as being paired with nodes H, A, and B; similarly current node F 408 is illustrated within the graphical representation of node pairings 404 as having direct connections to nodes H, A, and B). Node A may be determined as a reference node because A is a "smaller" alphabetical designation than alphabetical designations H and B of the other neighboring nodes (e.g., A is "smaller" than H and B) and because alphabetical designation A is "smaller" than the alphabetical designation for the current node F 408 (e.g., A is "smaller" than F). The neighboring nodes H and B may be disconnected from current node F 408, and may be connected to reference node A.

Current node H 410 is paired with neighboring node E, neighboring node F, and neighboring node G (e.g., current node H 410 is list within the set of node pairings 402 as being paired with nodes E, F, and G; similarly current node H 410 is illustrated within the graphical representation of node pairings 404 as having direct connections to nodes E, F, and G). Node E may be determined as a reference node because E is a "smaller" alphabetical designation than alphabetical designations F and G of the other neighboring nodes (e.g., E is "smaller" than F and G) and because alphabetical designation E is "smaller" than the alphabetical designation for the current node H 410 (e.g., E is "smaller" than H). The neighboring nodes F and G may be disconnected from current node H 410, and may be connected to reference node E.

Current node K 412 is paired with neighboring node J, neighboring node L, and neighboring node M (e.g., current node K 412 is list within the set of node pairings 402 as being paired with nodes J, L, and M; similarly current node K 412 is illustrated within the graphical representation of node pairings 404 as having direct connections to nodes J, L, and M). Node J may be determined as a reference node because J is a "smaller" alphabetical designation than alphabetical designations L and M of the other neighboring nodes (e.g., J is "smaller" than L and M) and because alphabetical designation J is "smaller" than the alphabetical designation for the current node K 412 (e.g., J is "smaller" than K). The neighboring nodes L and M may be disconnected from current node K 412, and may be connected to reference node J.

Current node L 414 is paired with neighboring node K and neighboring node M (e.g., current node L 414 is list within the set of node pairings 402 as being paired with nodes K and M; similarly current node L 414 is illustrated within the graphical representation of node pairings 404 as having direct connections to nodes K and M). Node K may be determined as a reference node because K is a "smaller" alphabetical designation than alphabetical designation M of the other neighboring node M (e.g., K is "smaller" than M) and because alphabetical designation K is "smaller" than the alphabetical designation for the current node L 414 (e.g., K is "smaller" than L). The neighboring node M may be disconnected from current node L 414, and may be connected to reference node K.

In this way, the set of node pairings 402 may undergo a first transformation. Nodes paired together within the set of node pairings 402 may represent pairs of employees that work for the same company. It may be appreciated that the result of the first transformation is illustrated by the set of node pairings 502 of FIG. 5.

Figure 5:
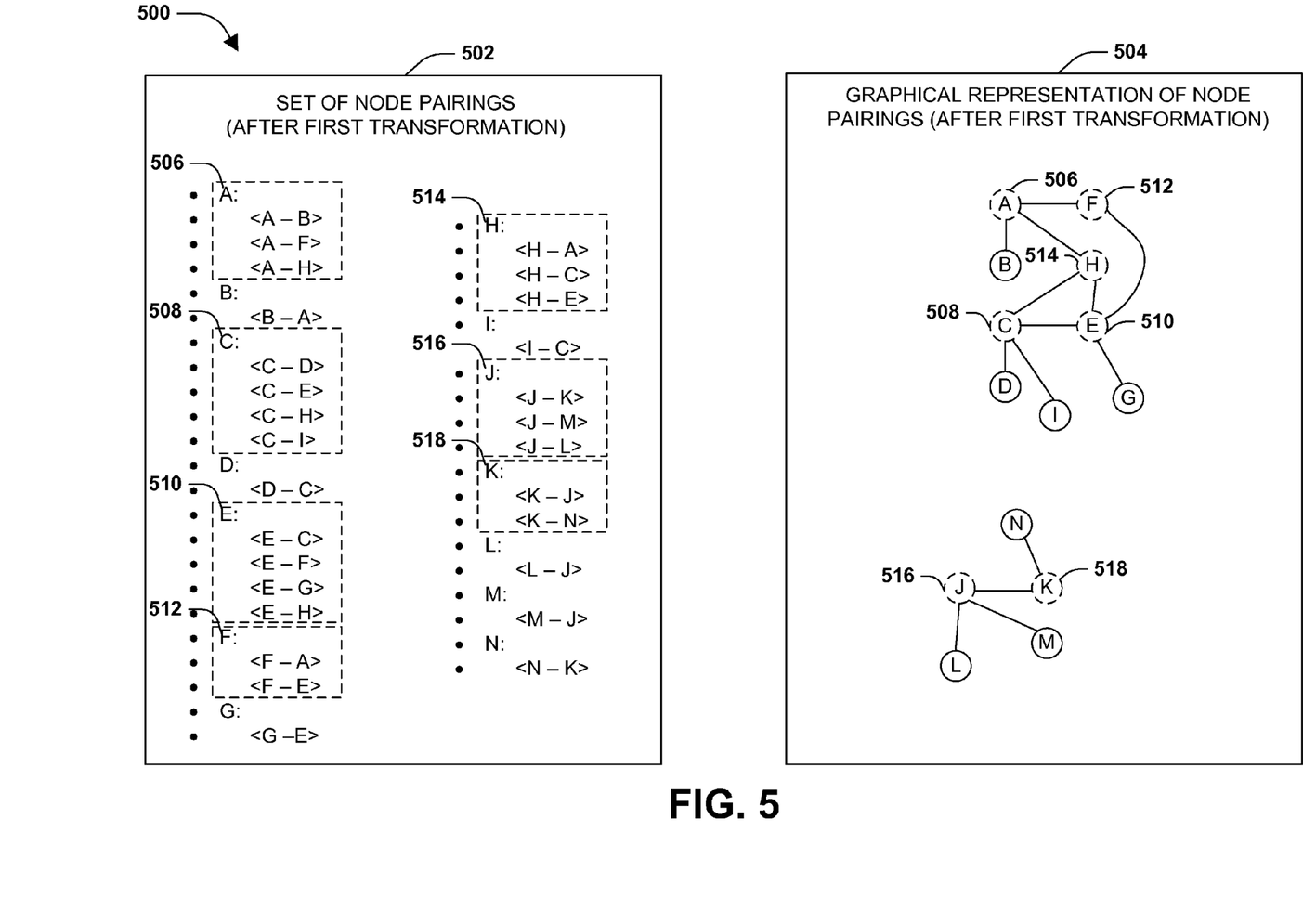
FIG. 5 is an illustration of an example of a set of node pairings and a graphical representation of the node pairings after a first transformation is performed, but before a second transformation is performed.

FIG. 5 illustrates an example 500 of a set of node pairings 502 and a graphical representation of the node pairings 504 after a first transformation is performed, but before a second transformation is performed. It may be appreciated that the set of node pairings 502 and the graphical representation of the node pairings 504 may illustrate the output of the first transformation as described in FIG. 4. It may be appreciated that the set of node pairings 502 may be an input to a second transformation, while the graphical representation of node pairings 504 is merely provided for illustrative purposes.

In one example of a second transformation, current node A 506, current node C 508, current node E 510, current node F 512, current node H 514, current node J 516, and current node K 518 may be processed. Current node A 506 is paired with neighboring nodes B, F, and H, where node B may be determined as the reference node because node B has the "smallest" alphabetical designation amongst the neighboring nodes of current node A 506. However, neighboring nodes F and H may not be disconnected from current node A 506 because reference node B's alphabetical designation of B is larger than or equal to current node A's alphabetical designation of A. Current node C 508 is paired with neighboring nodes D, E, H, and I, where node D may be determined as the reference node because node D has the "smallest" alphabetical designation amongst the neighboring nodes of current node C 508. However, neighboring nodes E, H, and I may not be disconnected from current node C 508 because reference node D's alphabetical designation of D is larger than or equal to current node C's alphabetical designation of C.

Current node E 510 is paired with neighboring nodes C, F, G, and H, where node C may be determined as the reference node because node C has the "smallest" alphabetical designation amongst the neighboring nodes of current node E 510. Neighboring nodes F, G, and H may be disconnected from current node E 510, and may be connected to reference node C. Current node F 512 is paired with neighboring nodes A and E, where node A may be determined as the reference node because node A has the "smallest" alphabetical designation amongst the neighboring node E of current node F 512. Neighboring node E may be disconnected from current node F 512, and may be connected to reference node A.

Current node H 514 is paired with neighboring nodes A, C, and E, where node A may be determined as the reference node because node A has the "smallest" alphabetical designation amongst the neighboring nodes of current node H 514. Neighboring nodes C and E may be disconnected from current node H 514, and may be connected to reference node A. Current node J 516 is paired with neighboring nodes K, M, and L, where node K may be determined as the reference node because node K has the "smallest" alphabetical designation amongst the neighboring nodes of current node J 516. However, neighboring nodes M and K may not be disconnected from current node J 516 because reference node K's alphabetical designation of K is larger than or equal to current node J's alphabetical designation of J.

Current node K 518 is paired with neighboring nodes J and N, where node J may be determined as the reference node because node J has the "smallest" alphabetical designation amongst the neighboring nodes of current node K 518. Neighboring node N may be disconnected from current node K 518, and may be connected to reference node J.

In this way, the set of node pairings 502 may undergo a second transformation. Nodes paired together within the set of node pairings 502 may represent pairs of employees that work for the same company. It may be appreciated that the result of the second transformation is illustrated by the set of node pairings 602 of FIG. 6.

Figure 6:
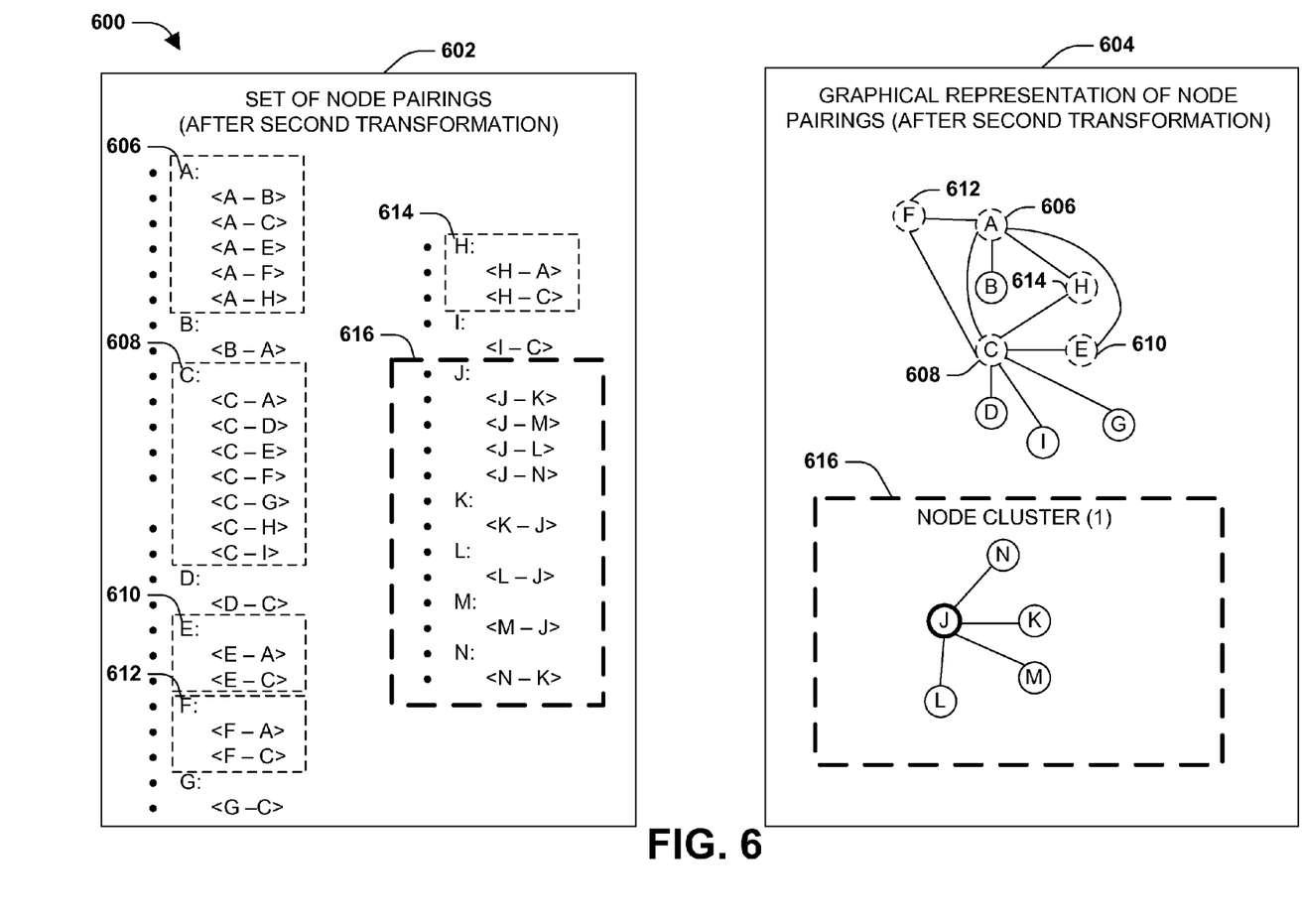
FIG. 6 is an illustration of an example of set of node pairings and a graphical representation of the node pairings after a second transformation is performed, but before a third transformation is performed.

FIG. 6 illustrates an example 600 of a set of node pairings 602 and a graphical representation of the node pairings 604 after a second transformation is performed, but before a third transformation is performed. It may be appreciated that a node cluster (1) 616 is illustrated within example 600 in order to illustrate that respective nodes within node cluster (1) 616 are connected to base node J (e.g., the smallest node within the node cluster (1) 616) and are connected to no other nodes. However, in one example, the node cluster (1) 616 may be unidentifiable until respective nodes (node A through node N) are connected merely to their smallest neighboring node and no other node, otherwise additional transforms may be performed because one or more nodes could still be connected to a smaller neighboring node (e.g., a transformation may or may not result in connecting additional nodes to nodes J, K, L, M, and/or N).

It may be appreciated that the set of node pairings 602 and the graphical representation of the node pairings 604 may illustrate the output of the second transformation as described in FIG. 5. It may be appreciated that the set of node pairings 602 may be an input to a third transformation, while the graphical representation of node pairings 604 is merely provided for illustrative purposes.

In one example of a third transformation, current node A 606, current node C 608, current node E 610, current node F 612, and current node H 614 may be processed. Current node A 606 is paired with neighboring nodes B, C, E, F, and H, where node B may be determined as the reference node. However, neighboring nodes C, E, F, and H may not be disconnected from current node A 606 because reference node B's alphabetical designation of B is larger than or equal to current node A's alphabetical designation of A. Current node C 608 is paired with neighboring nodes A, D, E, F, G, H, and I, where node A may be determined as the reference node. Neighboring nodes D, E, F, G, H, and I may be disconnected from the current node C 608, and may be connected to reference node A.

Current node E 610 is paired with neighboring nodes A and C, where node A may be determined as the reference node. Neighboring node C may be disconnected from current node E 610, and may be connected to reference node A. Current node F 612 is paired with neighboring nodes A and C, where node A may be determined as the reference node. Neighboring node C may be disconnected from current node F 612, and may be connected to reference node A. Current node H 614 is paired with neighboring nodes A and C, where node A may be determined as the reference node. Neighboring node C may be disconnected from current node H 614, and may be connected to reference node A.

In this way, the set of node pairings 602 may undergo a third transformation. Nodes paired together within the set of node pairings 602 may represent pairs of employees that work for the same company (e.g., nodes J, K, L, M, and N may represent employees of the same company because the node are connected within node cluster (1) 616, however, node cluster (1) 616 may be unidentifiable until all possible transformations are performed, otherwise additional nodes may end up connecting to node cluster (1) 616 during subsequent transformations). It may be appreciated that the result of the third transformation is illustrated by the set of node pairings 702 of FIG. 7.

Figure 7:
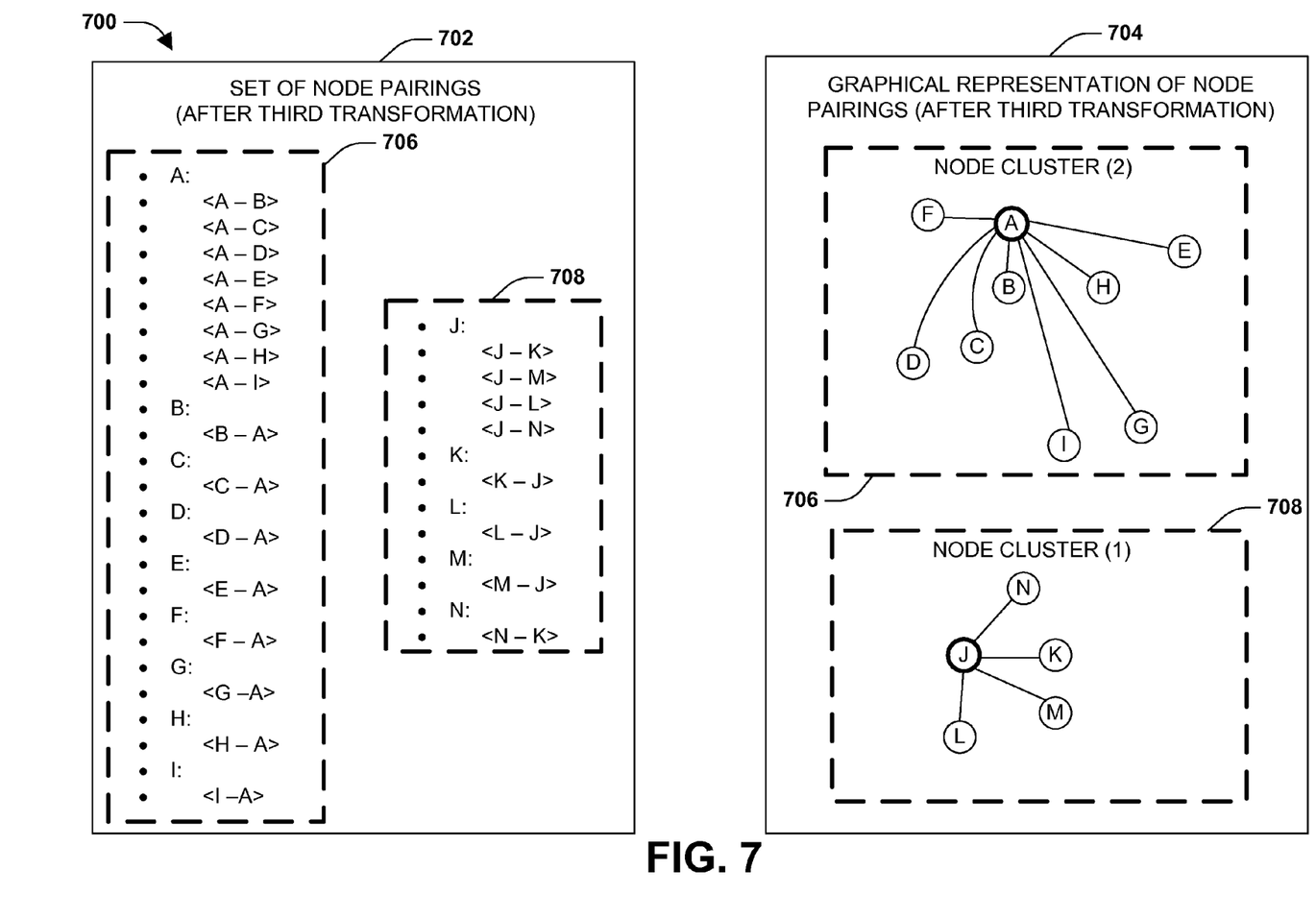
FIG. 7 is an illustration of an example of set of node pairings and a graphical representation of the node pairings after a third transformation is performed.

FIG. 7 illustrates an example 700 of a node cluster (1) 708 and a node cluster (2) 706 identified after a third transformation. It may be appreciated that the set of node pairings 702 and the graphical representation of the node pairings 704 may illustrate the output of a third and final transformation as described in FIG. 6. That is, no more transformations may be performed because respective nodes are already connected to their smallest neighboring node and no other node. For example, node B through node I are connected to their smallest neighboring node, node A. Thus, node A may be a base node of the node cluster (2) 706. Additionally, node K through node N are connected to their smallest neighboring node, node J. Thus, node J may be a base node of the node cluster (1) 708. In one example, node cluster (1) 708 may comprise nodes representing employees of company A, while node cluster (2) 706 may comprise nodes representing employees of company B.

Figure 8:
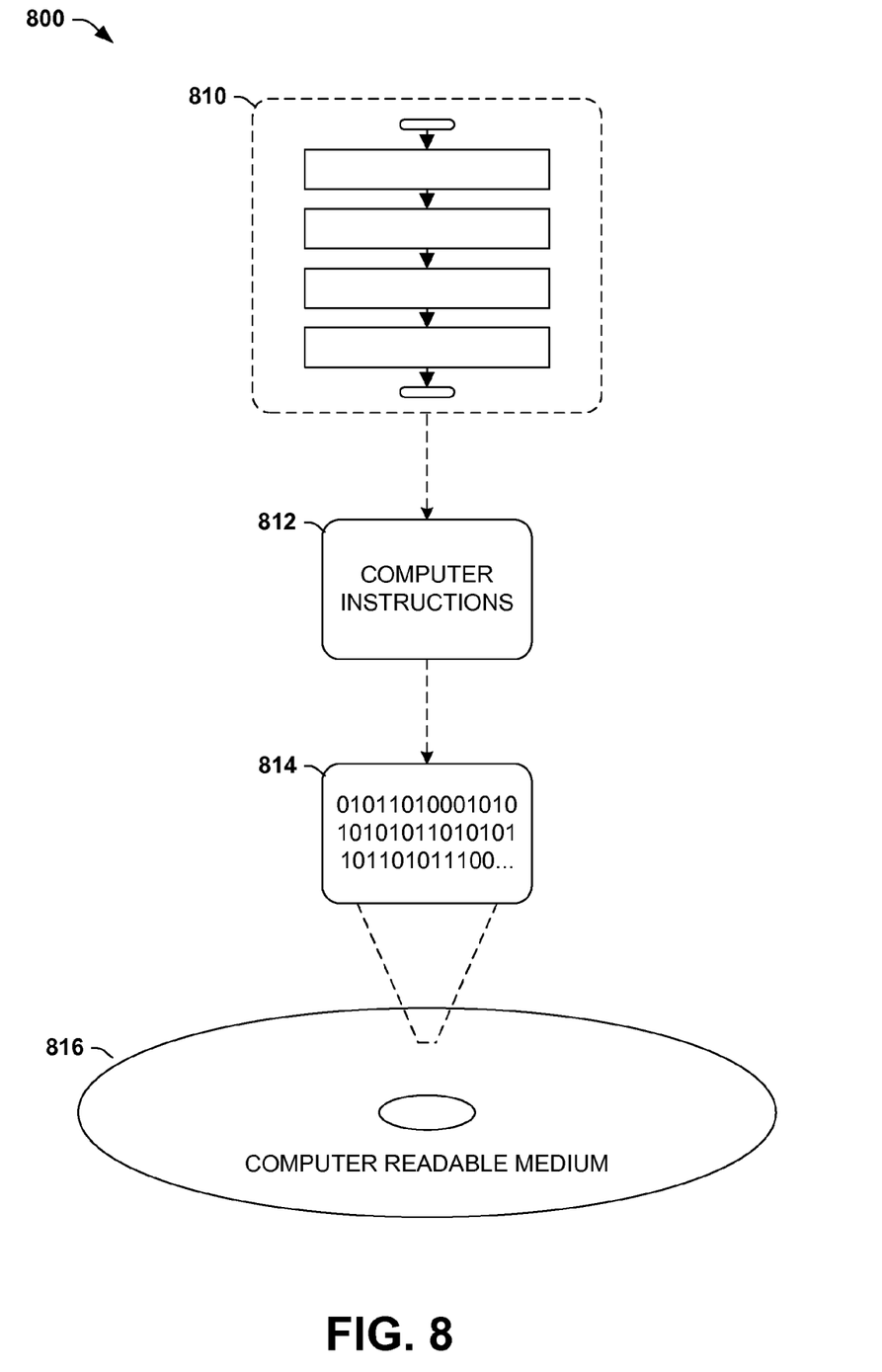
FIG. 8 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 816 (e.g., a CD-R, DVD-R, or a platter of a hard disk drive), on which is encoded computer-readable data 814. This computer-readable data 814 in turn comprises a set of computer instructions 812 configured to operate according to one or more of the principles set forth herein. In one such embodiment 800, the processor-executable computer instructions 812 may be configured to perform a method 810, such as the exemplary method 100 of FIG. 1 and/or exemplary method 200 of FIG. 2, for example. In another such embodiment, the processor-executable instructions 812 may be configured to implement a system, such as the exemplary system 300 of FIG. 3, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
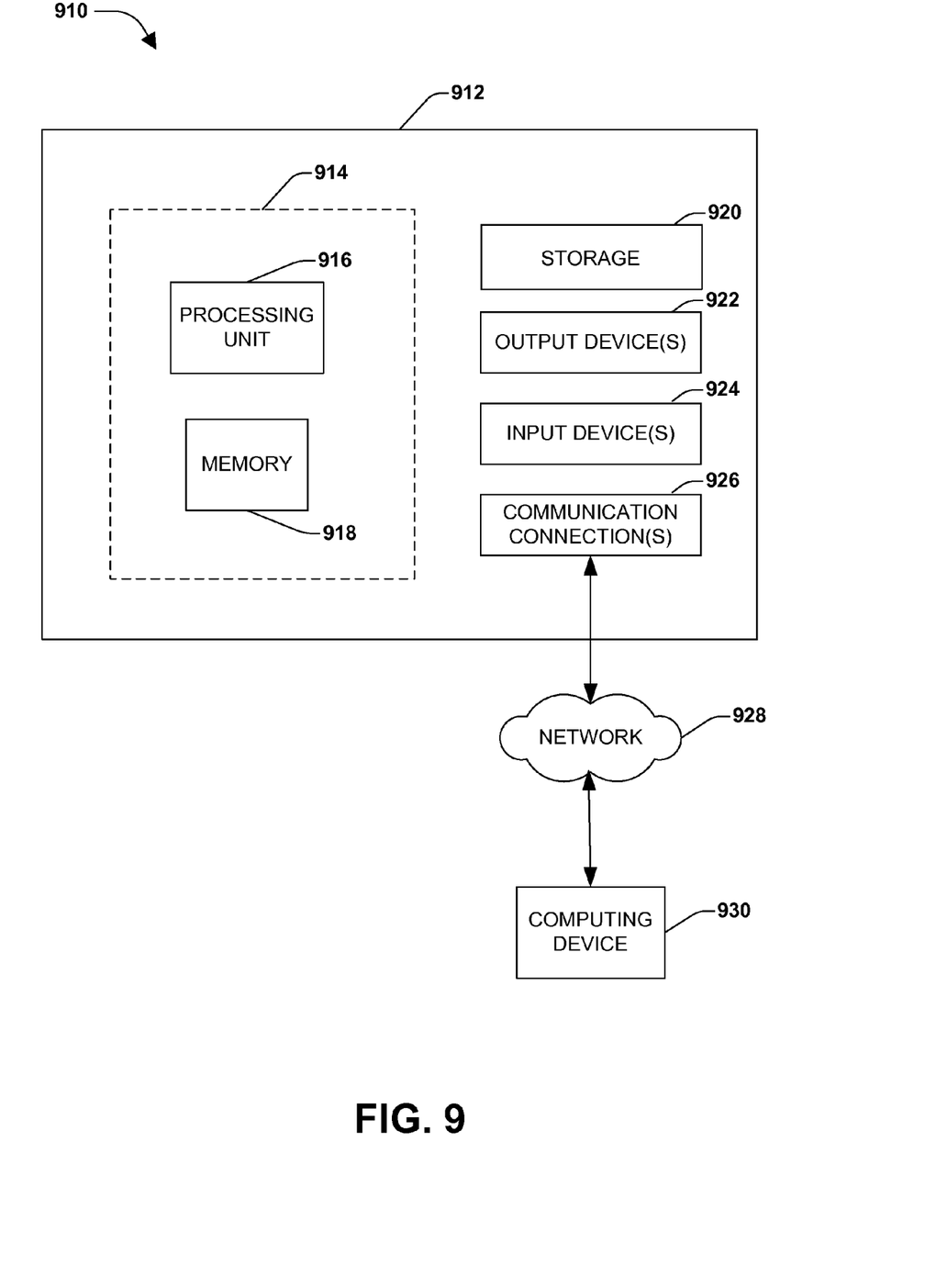
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via a network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, implemented at least in part via a processing unit, for identifying one or more node clusters, comprising:
    receiving a set of node pairings corresponding to a plurality of nodes, a node pairing comprising a first node connected to a second node; and
    transforming the set of node pairings one or more times until one or more node clusters are identified from the plurality of nodes, where nodes within a node cluster are paired with a base node within the plurality of nodes by a single connection and are connected to no other nodes, the transforming comprising:
        determining a current node, within the plurality of nodes, that is paired with two or more neighboring nodes, the two or more neighboring nodes comprising a first neighboring node and a second neighboring node;
        comparing a first value comprised in the first neighboring node to a second value comprised in the second neighboring node;
        determining that the first value is smaller than the second value based upon the comparing;
        determining that the first neighboring node is a reference node based upon the determination that the first value is smaller than the second value; and
        based upon the determination that the first value is smaller than the second value:
            disconnecting the second neighboring node, but not the first neighboring node, which is the reference node, from the current node; and
            connecting the second neighboring node to the first neighboring node,
        the current node, the first neighboring node and the second neighboring node representing a common type, the common type comprising at least one of:
            a user ID;
            a login ID;
            a cookie ID;
            a mobile phone ID; or
            an IP address.

2. The method of claim 1, comprising:
    assigning hash values to respective nodes within the plurality of nodes.

3. The method of claim 2, the first neighboring node comprising a hash value smaller than a hash value of the current node.

4. The method of claim 2, the disconnecting comprising:
if a hash value of the first neighboring node is larger than or equal to a hash value of the current node, then refraining from disconnecting the second neighboring node from the current node and refraining from connecting the second neighboring node to the first neighboring node.

5. The method of claim 2, the base node of the node cluster comprising a smaller hash value than respective hash values of other nodes within the node cluster.

6. The method of claim 1, the node pairing comprising:
a third node corresponding to a user ID and a fourth node corresponding to an IP address, or
a fifth node corresponding to an IP address and a sixth node corresponding to a user ID.

7. The method of claim 1, the transforming comprising:
concurrently operating on a plurality of current nodes in parallel.

8. The method of claim 1, nodes within the plurality of nodes representing individuals, and connections between nodes representing relationships.

9. The method of claim 1, comprising:
identifying a second node cluster from the plurality of nodes, where nodes within the second node cluster are paired with a second base node within the plurality of nodes by a single connection and are connected to no other nodes.

10. The method of claim 1, a node within the node cluster comprising a symmetric and transitive relationship with respective nodes within the node cluster.

11. The method of claim 1, comprising:
referencing the node cluster based upon the base node.

12. The method of claim 1, the node cluster corresponding to an individual and nodes within the node cluster representing descriptive data corresponding to the individual.

13. A system for identifying one or more node clusters, comprising:
a transformation module configured to:
receive a set of node pairings corresponding to a plurality of nodes, a node pairing comprising a first node connected to a second node;
transform the set of node pairings one or more times until one or more node clusters are identified from the plurality of nodes, where nodes within a node cluster are paired with a base node within the plurality of nodes by a single connection and are connected to no other nodes, a transformation comprising:
determining a current node, within the plurality of nodes, that is paired with two or more neighboring nodes, the two or more neighboring nodes comprising a first neighboring node and a second neighboring node;
comparing a first value comprised in the first neighboring node to a second value comprised in the second neighboring node;
determining that the first value is smaller than the second value based upon the comparing;
determining that the first neighboring node is a reference node based upon the determination that the first value is smaller than the second value; and
based upon the determination that the first value is smaller than the second value:
disconnecting the second neighboring node, but not the first neighboring node, which is the reference node, from the current node; and
connecting the second neighboring node to the first neighboring node,
the current node, the first neighboring node and the second neighboring node representing a common type, the common type comprising at least one of:
a user ID;
a login ID;
a cookie ID;
a mobile phone ID; or
an IP address.

14. The system of claim 13, comprising:
a hashing module configured to:
assign hash values to respective nodes within the plurality of nodes.

15. The system of claim 14, the first neighboring node comprising a hash value smaller than a hash value of the current node.

16. The system of claim 14, the transformation module configured to:
refrain from disconnecting the second neighboring node from the current node and refrain from connecting the second neighboring node to the first neighboring node if a hash value of the first neighboring node is larger than or equal to a hash value of the current node.

17. The system of claim 14, the base node comprising a hash value smaller than respective hash values of other nodes within the node cluster.

18. The system of claim 13, the transformation module configured to:
concurrently operate on a plurality of current nodes in parallel.

19. The system of claim 13, the transformation module configured to:
identify a second node cluster from the plurality of nodes, where nodes within the second node cluster are paired with a second base node within the plurality of nodes by a single connection and are connected to no other nodes.

20. A computer readable storage device comprising instructions that when executed, perform a method for identifying a cluster of nodes, comprising:
receiving a set of node pairings corresponding to a plurality of nodes, a node pairing comprising a first node connected to a second node; and
transforming the set of node pairings one or more times until one or more node clusters are identified from the plurality of nodes, where nodes within a node cluster are paired with a base node within the plurality of nodes by a single connection and are connected to no other nodes, the transforming comprising:
determining a current node, within the plurality of nodes, that is paired with two or more neighboring nodes, the two or more neighboring nodes comprising a first neighboring node and a second neighboring node;
comparing a first value comprised in the first neighboring node to a second value comprised in the second neighboring node;
determining that the first value is smaller than the second value based upon the comparing;
determining that the first neighboring node is a reference node based upon the determination that the first value is smaller than the second value; and
based upon the determination that the first value is smaller than the second value:
disconnecting the second neighboring node, but not the first neighboring node, which is the reference node, from the current node; and
connecting the second neighboring node to the first neighboring node, the current node, the first neighboring node and the second neighboring node representing a common type, the common type comprising at least one of:
a user ID;
a login ID;
a cookie ID;
a mobile phone ID; or
an IP address.

* * * * *